United States Patent [19]

West et al.

[11] Patent Number: 4,750,936

[45] Date of Patent: Jun. 14, 1988

[54] USE OF MULTIVALENT METAL HUMATES IN PRINTING INKS

[75] Inventors: James C. West, Lawrenceville; William C. Firth, Jr., Robbinsville, both of N.J.

[73] Assignee: Union Camp Corporation, Wayne, N.J.

[21] Appl. No.: 6,944

[22] Filed: Jan. 27, 1987

[51] Int. Cl.$^4$ ............................................. C09D 11/02
[52] U.S. Cl. ..................................... 106/22; 8/654; 106/20; 106/288 R; 534/693; 534/728
[58] Field of Search ..................... 106/20, 22, 288 R; 8/506, 654; 534/693, 728

[56] References Cited

U.S. PATENT DOCUMENTS

| | | | |
|---|---|---|---|
| 3,351,579 | 11/1967 | Baier | 534/728 |
| 3,379,650 | 4/1968 | Beasley et al. | 106/32 |
| 3,969,071 | 7/1976 | Hugelin | 8/654 |
| 4,245,990 | 1/1981 | Loeu et al. | 8/654 |
| 4,402,262 | 9/1983 | Handforth | 106/20 |
| 4,556,427 | 12/1985 | Lewis | 106/20 |
| 4,581,445 | 4/1986 | Ramanathan | 534/728 |
| 4,664,671 | 5/1987 | Gregory | 8/654 |

FOREIGN PATENT DOCUMENTS 0148412  7/1985  European Pat. Off. .

*Primary Examiner*—A. Lionel Clingman
*Assistant Examiner*—Willie J. Thompson
*Attorney, Agent, or Firm*—Edward J. Sites

[57] ABSTRACT

Stabilized, aqueous dispersions of multivalent metal humates are disclosed as a compatible and functional component in printing ink formulations.

7 Claims, No Drawings

USE OF MULTIVALENT METAL HUMATES IN PRINTING INKS

BACKGROUND OF THE INVENTION

1. Field of the Invention

The invention relates to humates and their use in printing ink and coating compositions. More particularly, the invention relates to the use of multivalent metal salts of humate compositions as components of printing and colorant coating compositions.

2. Brief Description of the Prior Art

A wide variety of organic and inorganic materials have been used over the centuries as components of printing and coating compositions.

For example, humic acids have been suggested as useful pigments in printing and compositure; see for example Steelink, Proceedings of the California Assoc. of Chemistry Teachers, Journal Chem. Ed. Vol. 40, No. 7, July 1963, pg. 379.

The term "humic acid" has been widely applied to acidic solids obtained from plant decompositions. More recently, humic acids have been regarded as the intermediate product or products which result in the conversion of lignin and other plant materials to hard coal. It is believed that in the decomposition of vegetable matter, the portion of the cell wall material consisting largely of lignin is converted into humus. In time, the humus may be converted progressively to peat, brown coal, bituminous coal and finally into anthracite. More usually, "humic substance" is applied as a generic term for the organic acids derived from humus or the top layer of the soil, containing organic decomposition products of vegetation and animal organisms in admixture with inorganic compounds, sand, minerals, metal hydroxide bases etc. The chemical structure of the humic acids has not been established, but they are believed to be large condensed ring, polymer-like molecules containing pendant carboxylic and phenolic groups. Depending on their solubilities, humic substances are usually classified as humic acid, fulvic acid, hymatomelanic acid or humin.

Monovalent alkali metal salts of humic acid or humate have also been described as useful components of printing inks; see for example U.S. Pat. No. 4,556,427.

We have discovered that multivalent metal humates used as binder components in aqueous ink compositions provide enhanced bleed resistance.

SUMMARY OF THE INVENTION

The invention comprises a printing ink composition, which comprises; an aqueous dispersion of a multivalent metal humate. The compositions are aqueous dispersions and thereby obviate the need for organic solvents and/or hydrocarbon oils as carrier vehicles.

As colorants, the ink compositions of the invention have a high affinity for cellulosic substrates. After drying on such substrates, the dried colorant resists removal by rubbing or by application of water or organic solvents. The colorant compositions of the invention also possess diffusion properties which limit its penetration into paper, thereby creating sharp and distinct images on paper.

The multivalent metal humates may be utilized as a component of printing inks that are commercially utilized in offset, letterpress, flexographic, and gravure printing.

DETAILED DESCRIPTION OF THE PREFERRED EMBODIMENTS OF THE INVENTION

The term "humate" as used throughout the specification and claims refers to the product of decayed plant and animal material (humus). The preferred multivalent metal humates employed in the method and compositions of the invention are derivatives of humates which are generally derivatives of the natural flocculation or precipitation in sand deposits, of humic substances that were derived from natural humus found in association with earth sources. A most preferred source of humate is one derived from humic substances found in association with titanium mineral deposits. Titanium mineral deposits include for example, ilmenite and rutile sand deposits. Titanium mineral sand deposits are found in several places throughout the world. In the United States, titanium sand deposits are located in Florida, Georgia and South Carolina. Titanium rock deposits may be found in the Adirondack mountains of New York State.

Other naturally occurring humate and humic sources include "leonardite", an oxidized form of lignite found chiefly in North Dakota and in the Menefee formation in northwestern New Mexico.

The term "multivalent metal humate" as used throughout the specification and claims means a salt of humate and a polyvalent metal cation such as, for example, calcium, zinc, iron, titanium, aluminum, chromium and the like.

The multivalent metal humate employed according to the invention may be prepared by reaction of the naturally occurring humate with a multivalent metal cation. Treatment with calcium hydroxide will effect the desired reaction to obtain calcium humate, as an example.

The multivalent metal humate is employed in the method of the invention by simple admixture with conventional ink or film coating compositions, as a component thereof.

When a multivalent metal humate is dispersed in water by a variety of means, including chemical and/or mechanical action, a stable dispersion is created. This dispersion is in essence a colored coating or ink which can be used for transferring images to various substrates.

When the colored coating or ink is dried, as observed by the evaporation and/or absorption of water into the substrate, a water insensitive image remains on the substrate. This image is also resistant to abrasion and dissolution by organic solvents. The humate based composition of the invention may be considered as a coating, staining or dyeing substance for numerous substrates. Multivalent metal humate compositions of the invention may be used as a coloring and coating substance, with and without chemical and physical modification, for many imprintable substrates including leather, textile materials, cellulosics such as paper, polymeric resin films such as films of polyolefins, metals and like materials. A preferred modification of the multivalent metal humates employed in the present invention is obtained by reaction of some or all of the humate carboxyl groups with a cationic dye to alter the red and yellow tones of the natural brown color associated with the unmodified multivalent metal humates. The color modified humates may be used as both colorant and binder ingredients of ink compositions of the invention, with an advantage of improved rub-resistance in comparison to compositions based on carbon black pigment. The dye modified calcium humate inks are particularly characterized by their bleed resistance.

A wide variety of cationic dyes are known and available for reaction with the multivalent metal humates to modify their color. The term "cationic dye" is used to mean a salt in which the chromophoric system resides in the cation. Their preparation is well known. Representative of cationic dyes are diphenylmethane dyes such as Auramine O and Auramine G; triphenylmethane dyes such as Pararosaniline, Malachite Green, Crystal Violet and Aurine; sulfonated triarylmethane dyes such as Naphthalene Green G and Patent Blue V; Xanthene dyes such as Eosine and Rhodamine B; acridine dyes such as Acridine Orange R; azine dyes such as Safranine T, CI Basic violets 5 and 8, Nigrosine and Aniline Black; oxazine dyes such as Meldola's Blue, Gallocyanine and Celestine Blue B; thiazine dyes such as Methylene Blue, Methylene Green, CI Basic Blue 24 and CI Basic Blue 25; and like cationic dyes.

The modification of the multivalent metal humate by reaction with a cationic dye may be carried out by simply bringing the reactants together in an aqueous mixture, in sufficient proportions to react some or all of the carboxylic acid groups on the humate molecule with the dye cation. In general, a proportion of the cationic dye equal to from 1 to 25 percent by weight of the humate is used, preferably 1 to 15 percent. The reaction proceeds in a satisfactory manner at room temperatures, but elevated temperatures up to circa 100° C. may be employed. The reaction occurs rapidly and is generally over in from 1 to 15 minutes, after which the dyed humate may be separated from the aqueous reaction mixture by conventional techniques, for example by filtration. Alternatively, separation of the dyed humate is not necessary and the crude reaction mixture may be employed as the colorant and resin binder components of the ink compositions of the invention.

The proportion of multivalent metal humate which may be employed in the improved compositions of the invention is generally not critical. In general, when employed principally as a pigment or a colorant, the multivalent metal humate may comprise from 1 to 50 percent by weight of the total ink composition. When employed principally as a binder, the multivalent metal humate may comprise from 1 to 50 percent by weight of the total composition.

The methods of applying the ink compositions of the invention and the apparatus employed are so well known that details need not be recited herein; see for example the Kirk-Othmer Encyclopedia of Chem. Technology, Vol. 16, pages 494–546.

The following examples describe the manner and process of making and using the invention and set forth the best mode contemplated by the inventor of carrying out the invention but are not to be construed as limiting.

Where reported, the test results were obtained by the following methods:

INK TESTING

The ink is drawn down into a film on newsprint paper using a #4 Mayer wire-wound rod. After 15 minutes drying time in ambient air the ink film is tested for bleed, dry rub, and wet-rub properties.

(i) Bleed Test

The newsprint paper containing the drawn down ink film is dipped in water and allowed to dry in ambient air. As a comparison-control, a humate control ink is also prepared and drawn down using unmodified humate. The amount of color that penetrated, or bled, to the reverse of the printed newsprint is compared and ranked on a scale of 1 (worst)–10 (best).

(ii) Dry Rub Test

The draw-downs are evaluated for dry rub resistance by pulling a clean sheet of newsprint, bearing a standard weight, across this drawn-down ink film. The standard weight is a 2 inch diameter by 3 inch length cylinder which weighs 1360 gm. Pulling rate is controlled as closely as possible at 2 in/sec. The weight is pulled across 6 inches of the drawn-down ink films.

Samples are rated by measuring the amount of ink rubbed off onto the clean, weighted newsprint using a densitometer set at zero optical density for the unprinted portion of the newsprint paper. A lower number signifies better dry-rub resistance.

(iii) Wet Rub Test

The wet rub resistance of ink is evaluated by a procedure identical to the dry-rub evaluation except for the following modifications:

The weighted paper used is 20 lb. Jamestown Xerographic copy paper and the densitometer is zeroed on that copy paper rather than the newsprint.

The copy paper is made wet by dipping into deionized water prior to pulling across the drawn-down ink film.

The weighted copy paper is drawn across only 3 inches of the drawn-down ink film.

Preparation 1

A quantity of titanium sand deposit was provided, from the Florida Geologic formation. The titanium sands are in a formation commonly referred to as "hardpan". The hardpan comprises titanium sands bound together by a coating of humate. It is humate from these titanium bearing sands which is employed in the present invention.

The desired humate is separated from the titanium sand deposits by first breaking up the deposit formation of hardpan into a ground ore of a convenient size for handling. Much of the humate in the ground ore can be washed off with water to effect the desired separation. Additional humate is obtained by washing the concentrated ore with aqueous sodium hydroxide. The aqueous mixture containing the free humates may then be treated with a strong mineral acid such as sulfuric acid or alum to regain the natural pH of the humates and facilitate setting out of the suspended humates. The separated humate may then be dried in the sunlight or by artificial means. The average composition of the titanium sand derived humate is as follows:

| COMPOSITION OF TITANIUM SAND HUMATE | | | | | | | | | | | | | | | |
|---|---|---|---|---|---|---|---|---|---|---|---|---|---|---|---|
| Elemental Composition (Dry Basis) (%) | | | | | "As Is" Moisture | Composition, Wt. % | | Functional Group Contents (Dry Basis) meq/g* | | Ratios, Wt./Wt, (Dry Basis) | | Metal Contents (Dry Basis) (%) | | | |
| C | H | O | N | S | | Ash ("As Is") | Ash (Dry Basis) | Total Acidity | Carboxylic Acid | C:H | C:O | AL | Ti | Fe | Ca |
| 36.7 | 2.3 | 23.7 | 0.6 | 0.3 | 9.8 | 30.9 | 34.3 | 6.0 | 2.1 | 16.0:1 | 1.5:1 | 6 | 1 | 1 | 0.1 |

*Methods for the functional group analysis may be found in M. Schitzer and S. U. Khan, "Humic Substances in the Environment," Marcel Dekker, Inc., New York, New York 1972, pp. 39–41. The barium hydroxide method for total acidity and calcium acetate method for carboxylic acid groups described in the citation were used.

Preparation 2 a quantity of titanium sand deposits was provided, from its Florida geological formation at Trail Ridge, Fla.

The humate was separated from the ilmenite deposits in a manner similar to that used in Preparation 1, supra. The following Table shows the elemental composition and metal content of the humate composition separated from the Trail Ridge deposit.

TABLE

| Element | Composition (%) |
|---|---|
| C | 45.21 |
| H | 3.25 |
| O | 23.75 |
| S | 0.30 |
| ash | 23.99 |
| Ti | 0.61 |
| Zr | 0.014 |
| Al | 5.34 |
| Fe | 0.46 |
| Ca | 0.007 |
| C/O ratio | 1.9:1.0 |
| C/H ratio | 13.9:1.0 |

It will be appreciated that the above analysis for humates associated with titanium ore deposits is for specific materials and the compositional make-up may vary somewhat for different materials within the same ore body. In general the preferred humate compositions employed in the method of the invention have compositional make-ups which provide a carbon to hydrogen ratio (weight to weight) of from 9.5–17.5:1.0; a carbon to oxygen ration of 1.0–2.3:1.09; an aluminum content of 2.8 to 8.4 percent by weight, a titanium content of 0.5 to 3.5 percent by weight and calcium content of less than 0.5 percent by weight.

It will also be appreciated from the above that the humate associated with titanium mineral deposits bears some resemblance in compositional make-up to leonardite, a humic substance. A commercially available leonardite has the following composition:

Preparation 3

Calcium Humate Preparation

Calcium humate is prepared by adding a 10% aqueous Ca(OH)$_2$ dispersion to a 20% suspension of humate obtained by the procedure of Preparation 1 or 2, supra. in water until a pH of 7-9 is achieved. The calcium humate is isolated in the form of a free-flowing powder.

EXAMPLE 1

INK PREPARATION 35.9 gm of calcium humate prepared according to Preparation 3, supra., is mixed with 30.1 gm carbon black (Cabot Vulcan K) and 140.5 gm deionized water. The mixture is adjusted to pH 7.4 by adding 0.5 ml of 28% ammonium hydroxide. This ink composition is ball-milled for five hours. An additional 120 ml of deionized water is required to achieve a pourable viscosity.

The calcium humate ink is subjected to testing and compared to inks prepared by the same procedure of Example 1 except the calcium humate as used therein is replaced with unmodified humate of Preparation 1, supra. The test results are shown in Table 1, below.

TABLE 1

| | Bleed | Dry Rub | Wet Rub |
|---|---|---|---|
| Calcium Humate Ink | 8 | .12 | .44 |
| Unmodified Humate Ink | 5 | .08 | .41 |

Preparation 4

Chromium Humate Preparation

Chromium humate is prepared by dry blending sodium dichromate with humate for 166 hours at 80° C. The product contains 5% chromium.

EXAMPLE 2

INK PREPARATION

| COMPOSITION OF A LEONARDITE | | | | | | | | | | | | | | |
|---|---|---|---|---|---|---|---|---|---|---|---|---|---|---|
| Elemental Composition (Dry Basis) (%) | | | | "As Is" Moisture | Composition, Wt. % | | Functional Group Contents (Dry Basis) meq/g* | | Ratios, Wt./Wt, | | Metal Contents (Dry Basis) (%) | | | |
| C | H | O | S | | Ash ("As Is") | Ash (Dry Basis) | Total Acidity | Carboxylic Acid | C:H | C:O | AL | Ti | Fe | Ca |
| 50.61 | 2.80 | 19.83 | 1.15 | 15.50 | 16.87 | 19.96 | 5.3 | 1.8 | 18.1:1 | 2.6:1 | 0.8 | 0.06 | 1.1 | 2.4 |

The commercially available Leonardite may be reacted with multivalent metal cations to provide a preferred metal humate for use in the method of the invention.

The humate materials of Preparations 1 and 2, described above and the conunercially available leonardite may be used to prepare multivalent metal humates as is or after separation of ash content.

Ink is prepared by mixing 35.7 gm chrome humate (Preparation 4, supra.) with 30 gm carbon black (Cabot, Vulcan K) and 140.7 gm H$_2$O. One ml 28% NH$_4$OH was added to achieve pH-9.5. The ink mixture is ball-milled for 20 hours.

The chromium humate ink is tested as in Example 1, supra. The test results are given in Table 2, below.

TABLE 2

|  | % Solids | Viscosity | Bleed Ranking | Dry Rub | Wet Rub |
| --- | --- | --- | --- | --- | --- |
| Chromium Humate Ink | 30 | 19.0 | 9 | .16 | .66 |
| Unmodified Humate Ink | 30 | 16.4 | 5 | .08 | .42 |

Preparation 5

Iron Humate Preparation 352.2 gm aqueous humate suspension (containing 76 gm dry humate) was diluted with deionized water to 18% and adjusted to pH 5–5.5 with 45 wt. % aqueous potassium hydroxide. This mixture was stirred and heated to 70° C. Ferric sulfate monohydrate (5.6 g) was dissolved in a minimum amount of deionized water and this solution was added to the potassium humate suspension over a ½-hour period. Temperature of the humate suspension was then raised to 75° C. and maintained for one hour. pH was adjusted to 10 with 45% KOH solution and the mixture was heated for another hour at 75°–80° C. The suspension was then freeze-dried. Iron content in the final product was 2% and moisture was 2.12%.

EXAMPLE 3

INK PREPARATION 31.09 gm of iron humate is mixed with 30.60 gm carbon black (Cabot, Vulcan K) and 141 gm deionized water. pH is 8.66 with no additional ammonia. The mixture is ball-milled for 6 hours. An additional 20 ml of deionized water is required for milling viscosity.

When tested as in Example 1, supra., the test results obtained are as in Table 3, below.

TABLE 3

|  | % Solids | Viscosity | Bleed Ranking | Dry Rub | Wet Rub |
| --- | --- | --- | --- | --- | --- |
| Iron Humate Ink | 24.8 | 17.3 | 1 | .01 | .40 |
| Unmodified Humate Ink | 30.0 | 16.4 | 5 | .06 | .31 |

Preparation 6

Zinc Humate Preparation

Zinc humate is prepared by adding 7.47 gm zinc oxide to 100 gm of spray dried humate from Preparation 1, supra. in 500 ml H$_2$O. This corresponds to 6% zinc content. After heating for 3 hours at 40°–50° the mixture stood overnight. Zinc humate is obtained by freeze-drying.

EXAMPLE 4

INK PREPARATION 33.33 gm of zinc humate is mixed with 30.2 gm carbon black (Cabot, Vulcan K) and 140.35 gm of deionized water. One ml of 28% ammonia is added to bring the pH to 7.6. Sixty ml of water is added to achieve grinding viscosity.

When tested as an Example 1, supra., the test results are given in Table 4, below.

TABLE 4

|  | % Solids | Viscosity | Bleed Ranking | Dry Rub | Wet Rub |
| --- | --- | --- | --- | --- | --- |
| Zinc Humate Ink | 23 | 13.9 | 9 | .08 | .48 |
| Unmodified Humate Ink | 30 | 15.0 | 7 | .09 | .31 |

Preparation 7

Aluminum Humate Preparation 352.2 gm aqueous humate suspension (containing 76 gm dry humate) was diluted with deionized water to 18% and adjusted to pH 5–5.5 with 45 wt. % aqueous potassium hydroxide. This mixture was stirred and heated to 75° C. Aluminum sulfate hydrate (8.95 gm of Al$_2$(SO$_4$)$_3$.16H$_2$O dissolved in 26.85 gm of deionized water) was added to the potassium humate suspension over a ½-hour period. Temperature of the humate suspension was maintained at 75° C. for one hour. The pH was adjusted to 9.7 with 45% KOH solution and the mixture was heated for another hour at about 75° C. The suspension was then freeze-dried. Aluminum content is 1% based on humate solids.

EXAMPLE 5

INK PREPARATION 30.91 gm aluminum humate is mixed with 30.61 gm carbon black (Cabot, Vulcan K) and 140.97 gm distilled water. 1 ml NH$_4$OH is added to bring the pH to 9.21. The mixture is rolled overnight on a ball mill. It required addition of 25 ml of deionized water for fluidity.

When tested according to the procedure of Example 1, supra., the test results are given in Table 5, below.

TABLE 5

|  | % Solids | Viscosity | Bleed Ranking | Dry Rub | Wet Rub |
| --- | --- | --- | --- | --- | --- |
| Aluminum Humate Ink | 27 | 25.3 | 0 | .15 | .63 |
| Unmodified Humate Ink | 30 | 15.0 | 7 | .09 | .31 |

EXAMPLE 6

18.37 gm calcium humate (Preparation 1, supra) was mixed with 0.75 Crystal Violet dye (Aldrich 22,928-8) and 80.88 gm water. The mixture was ball-milled overnight. An additional 30 gm water and 5 ml 28% NH$_4$OH was added and the mixture was ball-milled for an additional four hours. No additional resin or pigment was added.

When tested according to the procedure of Example 1, supra, the test results were as given in Table 6 below. The Table 6 also includes test results for a commercial aqueous newsink as a control.

TABLE 6

|  | % Solids | Viscosity | Bleed Ranking | Dry Rub | Wet Rub | Official Density |
| --- | --- | --- | --- | --- | --- | --- |
| Dyed Calcium Humate Ink | 14 | 14 | 9 | .00 | .12 | 1.23 |
| Commercial Aqueous Newsink (Control) | 36 | 17 | 9 | .01 | .28 | 1.56 |

As shown in Table 6 this dyed humate ink has significantly improved rub properties when compared with commercial aqueous newsink.

What is claimed is:

1. In a printing ink composition which comprises a pigment, a binder and a carrier, the improvement which comprises; the presence of 1–50% by weight a multivalent metal humate.

2. The improved composition of claim 1 wherein the humate is in the form of an aqueous dispersion stabilized by adjustment of the pH to a neutral or slightly alkaline state.

3. The improved composition of claim 1 wherein the humate is one selected from the group consisting of calcium humate, chromium humate, ferric humate, zinc humate and aluminum humate.

4. The reaction product of a multivalent metal humate and a cationic dye.

5. The product of claim 4 wherein the multivalent metal humate is calcium humate and the dye is Crystal Violet.

6. A printing ink composition which comprises the reaction product of a multivalent metal humate and a cationic dye, in an aqueous ink carrier vehicle.

7. The composition of claim 6 wherein the multivalent metal humate is calcium humate and the dye is Crystal Violet.

* * * * *